Figure 1:
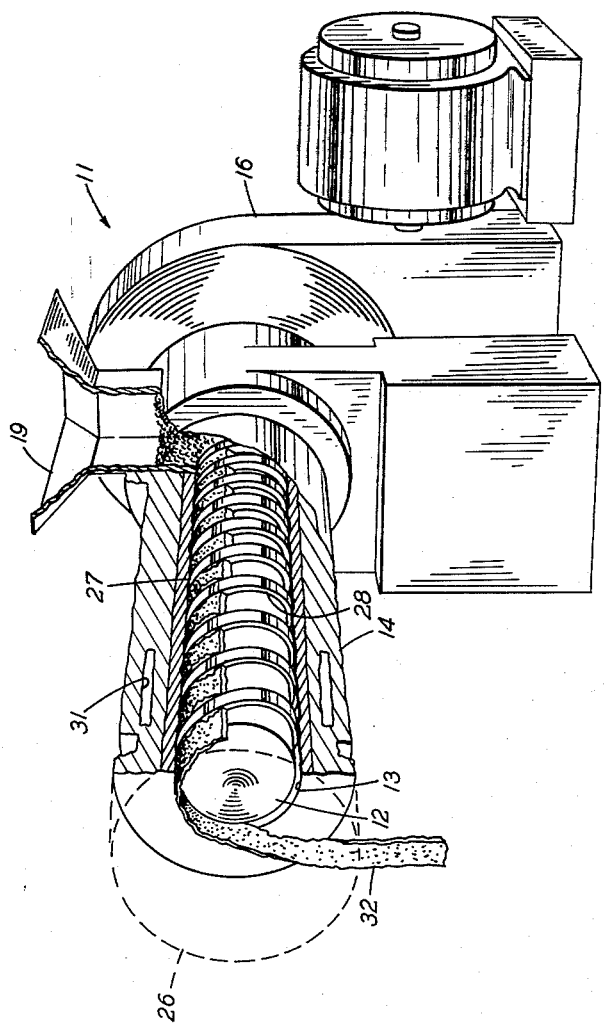

Jan. 1, 1963 W. E. KASKEL 3,071,498
METHODS OF AND COMPOSITIONS FOR CLEANING PLASTICS EXTRUDERS
Filed Nov. 9, 1960

INVENTOR.
W. E. KASKEL
BY
H. J. Winegar
ATTORNEY

United States Patent Office 3,071,498
Patented Jan. 1, 1963

3,071,498
METHODS OF AND COMPOSITIONS FOR
CLEANING PLASTICS EXTRUDERS
Walter E. Kaskel, Baltimore, Md., assignor to Western
Electric Company, Incorporated, New York, N.Y., a
corporation of New York
Filed Nov. 9, 1960, Ser. No. 68,274
25 Claims. (Cl. 134—7)

This invention relates to methods of and compositions for cleaning plastics extruders, and more particularly to methods of and compositions for removing undesirable residues and deposits of organoplastics from interior plastic-working surfaces of plastics extruders.

In the manufacture of insulated, electrical conductors, a bare conductor is advanced continuously through a plastics extruder which forms a coating of an organoplastic insulation thereon. This insulation, for example, may be composed of solid or cellular organic thermoplastic compound, such as polyvinyl chloride, polyethylene or the like. The organic thermoplastic compound, which in many cases is charged into the plastics extruder in the form of granules, is worked and advanced by a rotatable stock screw having one or more helical threads, and is discharged through a die which forms the organoplastic compound into a concentric tubular covering on the conductor.

From time to time, for example at the end of a production run, it is necessary to shut down the plastics extruders. Before starting up the plastics extruders again, it may be necessary to clean the interior plastics-working surfaces thereof. Organoplastic compounds tend to leave deposits in the plastics extruders, which may occur, for example, because of local overheating and decomposition of the organoplastic composition being extruded, causing such deposits to adhere to the interior, plastics-working walls and the stock screws of the plastics extruders. Such deposits may adhere temporarily to the walls and the stock screws of the plastics extruders, from which they may be subsequently dislodged, resulting in product defects. In the course of time these deposits may also accumulate to an undesirable extent. Such accumulated deposits may constrict passages between the walls of the plastics extruder and the stock screw, which, in turn, will result in increases in pressures within the plastics extruders and longer exposure of the organoplastic material to heat and pressure. The increased pressures that develop within the plastics extruders and longer exposure of the organoplastic compound to the heat can cause additional degradation, oxidation and charring of the organoplastic compound.

Another instance in which it is necessary to clean the plastics extruders occurs when changing the color or type of the organoplastic compound being extruded. It is desirable to remove all traces of the previously used organoplastic compound from the interior of the plastics extruders to prevent discoloration of the subsequent extrudate.

Heretofore, the undesirable deposits and residues were removed by various methods, such as by disassembling of the plastics extruders to remove the stock screws and brushing the stock screws and the interior plastics-working surfaces of such disassembled plastics extruders, by cleaning of the plastics extruders in assembled and disassembled form by using hot or cold solvents, and by displacement or flushing out of one organoplastic compound from the plastics extruders by another. The displacement and flushing out methods included passing an organoplastic compound through the plastics extruders, the organoplastic compound being of the type desirable to be removed or of the type to be extruded next; or passing a commercial purging compound, which often contained abrasive fillers, through the plastics extruders.

However, these cleaning methods are not entirely satisfactory. Some are extremely time-consuming and relatively expensive. For example, removal of a stock screw and brushing thereof and the internal plastics-working surfaces of a standard plastics extruder are necessarily time-consuming in order to produce a desired degree of cleaning, particularly in cases where it is necessary to remove stubborn deposits of organoplastics, such as polyethylene. Removal of the undesirable deposits by means of suitable solvents may present problems of time, amounts of solvent material and adverse physiological effects of solvents on the operating personnel, for example in cases of removal of deposits of polyethylene by hot or even boiling xylene or the like. Cleaning of plastics extruders by displacement of the undesirable deposits and residues of an organoplastic compound by means of an organoplastic compound of the type desired to be removed or of a different type to be used next, or by means of commercial purging compounds, may present problems of time and amounts of material before the organoplastic compound desired to be removed is completely removed from the plastics extruders. These problems may be especially acute in cases where frequent changes from one color or formula to another is necessary.

An object of this invention is to provide new and improved methods of and compositions for cleaning plastics extruders.

Another object of the invention is to provide new and improved methods of and compositions for removing undesirable residues and deposits of organoplastics from interior plastics-working surfaces of plastics extruders.

A composition for cleaning interior plastics-working surfaces of plastics extruders, which illustrates certain features of the invention may include a granulated organoplastic material, and silicone oil in the form of a film coating the granules of the organoplastic material. The organoplastic material is physically incompatible with the silicone oil and has thermoplastic properties.

A method of cleaning interior plastics-working surfaces of plastics extruders, which illustrates certain features of the invention, may include the steps of applying a film of silicone oil to a granulated organic thermoplastics material physically incompatible with silicone oil, and simultaneously rotating the stock screw of a plastics extruder to be cleaned and feeding the silicone oil-coated granulated material into the interior of the plastics extruder until the interior plastics-working surfaces thereof are cleaned of undesirable residues and deposits of organoplastic materials extruded previously therethrough.

Figure 2:
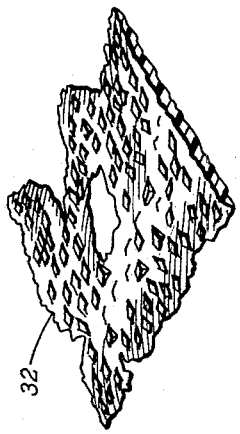

A complete understanding of the invention may be had from the following detailed description of illustrative methods and compositions embodying the invention, when read in conjunction with the appended drawings, in which:

FIG. 1 is a perspective view of a screw-type plastics extruder being cleaned, with parts thereof broken away for clarity, and FIG. 2 is a view of a portion of a strip of a cleaning composition, shown in FIG. 1 after emerging from the plastics extruder.

Referring now to FIG. 1, there is shown a conventional plastics extruder, designated generally by the numeral 11, which includes a stock screw 12. The latter is mounted rotatably within a cylindrical bore 13 formed within an extruder barrel 14. Power-driven means 16 is provided for rotating the stock screw 12 to advance an organic thermoplastic compound from a feed hopper 19 to the delivery end of the bore 13. In normal operation, extrusion tools, including a core tube, a die, and a straining screen (not shown), are mounted in a conventional head 26, illustrated in phantom lines in FIG. 1, which is removably secured to the discharge end of the barrel 14.

The stock screw 12, which is shown merely as an illustration of one of the many various forms and types of stock screws used in the plastics extruders, is provided with a helical thread 27, which forms a helical channel 28 characterized by a constant pitch and a gradually decreasing depth from the feed hopper zone to the discharge end of the barrel 14. This type of stock screw structure provides a vigorous working and plasticizing action of increasing intensity as the organic thermoplastic compound is advanced thereby.

In those types of plastics extruders requiring auxiliary heating or cooling thereof to control the temperature of the advancing thermoplastic insulating compound, the stock screw 12 may be provided with a longitudinally extending internal passage (not shown) into which extends a pipe (not shown) for introducing a heat-exchange medium, for example water under pressure. Such medium may be hot or cold, as required, to control the temperature of the stock screw 12 and thus the temperature of the organic thermoplastic compound. Cold water is commonly required in the normal operation of some plastics extruders to dissipate excess heat generated internally by the extrusion operation. In a similar manner, the barrel 14 may be provided with a passage, such as the passage 31, through which a liquid temperature-control medium may be circulated to additionally control the temperature of the organic thermoplastic compound as desired. In cases of autogenous extrusion, such heating and cooling controls are not required during the normal operation.

When an organoplastic material, such as polyethylene or vinyl compounds, for example, polyvinyl chloride, is extruded by means of a plastics extruder of the type described, irregular deposits of the organoplastic material may collect on the walls of the bore 13 or on the stock screw 12. Such deposits may occur because of local overheating and decomposition of the compound being extruded. These deposits tend to disintegrate, oxidize and char, and may build up on the interior surfaces and subsequently become dislodged. Eventually the straining screen may become clogged, and the channel of the stock screw may become obstructed to such an extent that impairment of the efficiency of the plastics extruder results. The build-up of such deposits then leads to build-up of excess pressures within the plastics extruder, longer exposure of the organic thermoplastic compound to heat and working, decrease in output, and, in cases where relatively coarse straining screens are used, the inclusion of dislodged particles of the deposits in the finished insulation. It is possible that the excessive pressures may damage the plastics extruder, and that such dislodged particles may cause objectionable imperfections in the extruded insulation. It then becomes necessary to clean the interior plastics-working surfaces of the plastics extruders to remove these deposits therefrom with as little expenditure of time and material as possible. Similarly, at the end of a normal operating run, or when it is necessary to change the color or the type of insulating organic thermoplastic compound being extruded, it is desirable to remove the residues of such a compound with as little expenditure of time and material as possible.

To accomplish the desired cleaning, the extrusion of the insulating compound by the plastics extruder 11 should be discontinued, preferably the head 26 removed, and the interior plastics-working surfaces of the plastics extruder cleaned with new and improved cleaning compositions embodying the invention until these interior plastics-working surfaces are cleaned of these undesirable residues and deposits. In accordance with the present invention, cleaning compositions are provided which are employed to clean plastics extruders by new and improved methods embodying the present invention. Generally, such cleaning compositions comprise a granulated organic thermoplastic material, the granules of which are coated with a relatively thin film of silicone oil. More specifically, such compositions comprise a granulated organic thermoplastic material, the granules of which are coated with a film of silicone oil, the viscosity of which is of the order of from about 20 centistokes to about 100,000 centistokes at 25° C., preferably of the order of from about 40 centistokes to about 10,000 centistokes at 25° C., in proportions of from about 0.2 percent to about 2 percent by weight of the thermoplastic material.

The term "granulated organic thermoplastic material," as employed herein, is meant to include an organic thermoplastic material of either virgin or compounded type, in the form of relatively coarse powders, flakes, granules and pellets of various sizes and shapes, preferably pellets in the form of nominal ⅛ inch cubes, commonly used throughout the plastics industry for making organoplastic articles by extrusion. This term also means organoplastic materials having thermoplastic properties differentiated from inorganic plastic materials and metals.

The term "silicone oil," as is used throughout the specification and claims, defines silicone fluids of dimethylsiloxane and methylphenylsiloxane types. The dimethylsiloxane-type silicone fluids, also called dimethyl silicone fluids, are linear polymers of alternating silicone and oxygen atoms, i.e. of siloxane groups, each silicone atom having two methyl groups attached to it. The ends of each chain of a methyl silicone fluid are blocked by silicone atoms, each having three methyl groups attached thereto to stabilize the viscosity of the dimethyl silicone fluid against polymerization upon standing.

The dimethyl silicone fluid may be represented by the general formula:

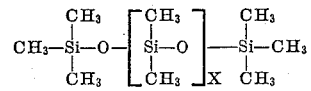

wherein X is a whole number which varies over a very wide range and denotes the number of dimethylsiloxane groups per mole of dimethyl silicone fluid, and, therefore, the length of the polymer chain. The length of the polymer chain, in turn, determines the viscosity of the oil: the greater the length of the polymer chain, the greater the viscosity of the dimethyl silicone fluid. Some of the low-molecular weight and low-viscosity dimethyl silicone fluids may also be of the branched type, having additional end-blocking trimethyl groups.

The methylphenylsiloxane-type silicone fluids, also called methylphenyl silicone fluids, are linear siloxane polymers resembling the dimethyl silicone fluids. However, some of the silicon atoms of the alternating silicone and oxygen atom groups, i.e. of the siloxane groups, may have one or both of the methyl groups attached thereto substituted by phenyl groups.

Dimethyl silicone fluids and the methylphenyl silicone fluids are obtainable from various sources, such as Dow Corning Corporation, Midland, Michigan; Silicone Products Dept. of General Electric Company, Waterford, New York, and Silicones Division of Union Carbide and Carbon Corporation, under various trade designations in a very wide range of viscosities ranging from 0.65 centistoke to several millions of centistokes. For example, suitable dimethyl silicone fluids of various viscosities are obtainable from the Dow Corning Corporation, under the trade designation "200 Fluids," and from the Silicone Products Department of General Electric Company, under the trade designation "SF-96."

Silicone oils are heat stable both chemically and physically, even at relatively high temperatures, such as 400° F.; have relatively high flash point, e.g. dimethyl silicone oils, having viscosities of 100 centistokes and more, have a flash point of the order of 600° F. in an open cup;

have low volatility, providing durability with relatively low smoke and evaporation loss; are chemically inert; practically noncorrosive to the metals, and physically incompatible with most of the organoplastic compounds and metals. Also, the silicone oils are practically inert physiologically, either by skin contact or internally. These properties make silicone oils especially valuable in applications where it is desirable to clean plastics extruders at relatively high temperatures, such as 300° F.–400° F.

In cases where it is desirable to apply a very thin film of silicone oil or where it is inconvenient to measure relatively small quantities of silicone oil, silicone emulsions are used of an oil-in-water type having from about 35 percent to about 50 percent of silicone oil by weight of emulsion in a wide range of viscosities of silicone oil. The silicone emulsions, besides silicone oil and water, contain also small amounts of emulsifying agent and a rust inhibitor.

Silicone oil-in-water emulsions of silicone oils having viscosities of 350, 1000 and 10,000 centistokes at 25° C. are available as LE–45, LE–450, and LE–46, respectively, from Silicones Division of Union Carbide and Carbon Corporation, in concentration of 35 percent of silicone oil by weight of emulsion. Similarly, silicone oil-in-water emulsions of silicone oils having viscosity of 200 to 350 centistokes at 100° F. are available, in concentrations of from 36 percent to 38 percent of silicone oil by weight of emulsion, as SM–61 silicone oil emulsions from Silicone Products Department of the General Electric Company. Where it is necessary to apply silicone oil in very thin films, these emulsions may be further readily diluted by water, for example, to form emulsions having as little as one percent and even less of silicone oil by weight thereof.

Suitable cleaning compositions may be prepared by applying a thin film of liquid or greasy material to a granulated organoplastic material while maintaining the granulated form of the organoplastic material relatively unchanged. One method is simply to combine a desired amount of granulated organoplastic material with silicone oil to mix the combined ingredients vigorously until the granulated organoplastic material is coated with a substantially uniform film of silicone oil. More specifically, a desired amount of granulated organoplastic material is placed in a tumbling barrel of suitable size and, while the organoplastic material is tumbled, silicone oil, as such, or as a silicone oil-in-water emulsion, is added to the granulated organoplastic material in any suitable way, such as by sprinkling or spraying, and the ingredients are tumbled until the granulated organoplastic material is coated with a relatively uniform film of silicone oil. The amounts of silicone oil actually added to the granulated organoplastic material, during the preparation of the cleaning compositions, may vary slightly, depending on the methods and apparatus used for preparation thereof.

The following examples of cleaning compositions are given as illustrative, but not limitative, embodiments of the invention:

Example I

A satisfactory cleaning composition is obtained by mixing approximately 10.00 lbs. of pelletized polyvinyl chloride with 0.02 lb. of SF–96 silicone oil having a viscosity of 40 centistokes at 25° C. The mixing is continued until the pellets are coated with a film of silicone oil amounting on the average to 0.2 percent of silicone oil by weight of the pellets.

Example II

A satisfactory cleaning composition is obtained by mixing approximately 10.00 lbs. of pelletized polyvinyl chloride with 0.05 lb. of SF–96 silicone oil having a viscosity of 40 centistokes at 25° C. The mixing is continued until the pellets are coated with a film of silicone oil amounting on the average to 0.5 percent of silicone oil by weight of the pellets.

Example III

A satisfactory cleaning composition is obtained by mixing approximately 10.00 lbs. of pelletized polyvinyl chloride with 0.20 lb. of SF–96 silicone oil having a viscosity of 40 centistokes at 25° C. The mixing is continued until the pellets are coated with a film of silicone oil amounting on the average to 2 percent of silicone oil by weight of the pellets.

Example IV

A satisfactory cleaning composition is prepared by mixing approximately 10.00 lbs. of pelletized polyvinyl chloride with 0.06 lb. of an LE–45 silicone oil emulsion. The mixing is continued until the silicone oil emulsion is dispersed throughout the pellets in the form of a film of silicone oil emulsion amounting on the average to 0.2 percent of silicone oil by weight of the pellets.

Example V

A satisfactory cleaning composition is prepared by mixing approximately 10.00 lbs. of pelletized polyvinyl chloride with 0.15 lb. of an LE–45 silicone oil emulsion. The mixing is continued until the silicone oil emulsion is dispersed throughout the pellets in the form of a film of silicone oil emulsion amounting on the average to 0.5 percent of silicone oil by weight of the pellets.

Example VI

A satisfactory cleaning composition is prepared by mixing approximately 10.00 lbs. of pelletized polyvinyl chloride with 0.57 lb. of an LE–45 silicone oil emulsion. The mixing is continued until the silicone oil emulsion is dispersed throughout the pellets in the form of a film of silicone oil emulsion amounting on the average to 2 percent of silicone oil by weight of the pellets.

In all of Examples I to VI, inclusive, the pellets are polyvinyl chloride compounds, designated Geon 8851 by B. F. Goodrich Chemical Company, Cleveland, Ohio, and used normally for jacketing telephone cordage. These polyvinyl chloride compounds are supplied in a variety of colors in the form of pellets, 98 percent of which pass through a 5/16 inch sieve, preferably in the form of cubically shaped pellets 1/8 inch in size, and have a stock extrusion temperature of approximately from 325° F. to 390° F. at the normal working condition of screw-type plastics extruders. The material and properties of these polyvinyl chloride pellets are substantially identical with those of pellets of a polyvinyl chloride insulating compound, designated Geon 8818 by B. F. Goodrich Chemical Company. In each of Examples I to VI, inclusive, the silicone oil, per se or as a silicone oil-in-water emulsion, has been added to the pelletized polyvinyl chloride in slight excess to provide for small amounts of silicone oil lost as a film spread upon the walls of a mixing apparatus used to prepare the cleaning compositions.

Preparatory to cleaning the plastics extruders, such as the plastics extruder 11, the head 26, including the extruding tools, is removed and the cleaning composition is charged into the feed hopper 19 while the stock screw 12 is driven rotatably at the normal operating speed of an extrusion operation. The stock screw 12 forces the cleaning composition through the plastics extruder 11. The cleaning composition emerges from the discharge end of the barrel 14 of the plastics extruder 11 in the form of a ribbon 32 of softened granules of the organoplastic material of the cleaning composition.

The compositions mentioned in the Examples I to VI, inclusive, were used to clean plastic extruders, of the type of the plastics extruder 11, which were previously used to extrude polyvinyl chloride insulation, such as Geon 8818, on a conductor. In each case, prior to cleaning the plastics extruder 11, and after the head 26 was removed, the insulating polyvinyl chloride composition being extruded was removed as well as possible from the plastics extruder, being cleaned, by simply continuing to rotate the stock screw 12. In each case between about one pound and about three pounds of cleaning composition were then charged into the feed hopper 19 while continuing to rotate the stock screw 12 at the normal working speed thereof and maintaining the temperature of the stock screw 12 and the barrel 14 in the range from about 300° F. to about 400° F., usually between about 325° F. and 350° F., i.e. at working conditions approaching the normal working conditions of the plastics extruder 11 for the particular type of polyvinyl chloride insulating compound being normally extruded.

The residues of the insulating polyvinyl chloride compositions were purged by the cleaning composition from the plastics extruder 11 within about 10 to 30 seconds, and the last portions of the cleaning composition emerged from the delivery end of the barrel 14 within about 1 to 3 minutes after the charging of the cleaning composition into the feed hopper 19. The plastics extruder 11 was then blown out with compressed air and dismantled by removing the stock screw 12. In most cases no undesirable deposits were found on the surfaces of the stock screw 12 and the walls of the bore 13, and these surfaces were bright and shiny.

However, it has been observed that when the cleaning compositions of the Examples II and V, i.e. those containing the silicone oils in relatively low proportions, were used for cleaning the plastics extruder 11, the cleaning compositions emerged from the discharge end of the barrel 14 in the form of a shapeless, elongated, plastic mass rather than in the form of a ribbon and slight deposits of the softened cleaning compositions were left on the stock screw 12 near the threads thereof. These deposits were easily removed by simply going over the stock screw 12 with a gloved hand, which left the surface of the screw bright and shiny. These deposits tended to be heavier when the plastics extruder 11 was cleansed with the cleaning compositions of Examples II and V while the temperatures of the plastics extruder were at or above the stock extrusion temperature of the polyvinyl chloride ingredient of the cleaning composition.

Small residues of silicone oil on the walls of the bore 13 of the plastics extruder 11 were removed easily by successive forcing of the insulating polyvinyl chloride composition therethrough during the preparation thereof for the next insulating operation, for example, during the normal start-up period in which the plastics extruder is brought up to proper working temperature. It has been observed that when silicone oil was used in amounts exceeding the preferred range, the removal of silicone oil from the plastics extruder was more difficult, but not impossible. In cases where it is desirable to speed up the removal of traces of the silicone oil from the plastics extruders, a suitable absorbent material may be forced through the cleaned plastics extruder prior to use of an insulating organoplastic composition, or the walls of the bore 13 and the surface of the stock screw 12 may be simply wiped off with a rag.

Without limiting the invention to any theory and merely for the purpose of facilitating the comprehension of the above-identified method and composition, the following mechanism is proposed whereby adherent plastic material is removed from the plastics extruders by contact with the cleaning composition. By physical inspection it appears that a film of silicone oil on the surface of the granulated organic thermoplastic material causes the granules of the latter to pass through the plastics extruders without being worked as severely as when the insulating organoplastic composition is worked under normal operating conditions of the plastics extruders, even if the temperature of the plastics extruder is maintained at substantially the normal working temperature thereof or slightly above the recommended stock extrusion temperature of the granulated organic thermoplastic material of the cleaning composition. The silicone oil envelops the granules of the granulated organic thermoplastic material so as to prevent the granules from sticking to the surfaces of the bore 13 and the stock screw 12 and to cause the granules to slip relative to each other and to these surfaces, thereby reducing the amount of working of the granules of the cleaning composition in the plastics extruders. As a result, a substantial portion of the granules of the cleaning composition, even though somewhat softened and deformed, retain their plastic memory, i.e. substantially retain their granulated form and original plastic properties, so that the cleaning composition produces a "brushing" or "scouring" effect on the surfaces of the walls of the bore 13 and the stock screw 12. Simultaneously, the silicone oil, partially because of its relatively low surface tension and partially because of the vigorous working by the stock screw 12, spreads from the granules of the advancing cleaning composition onto the residues of the insulating plastic material and onto the surfaces of the plastics extruder so as to prevent sticking of the insulating organoplastic material to these surfaces and to cause a releasing action thereon. Similarly, silicone oil also spreads around and between the stubborn deposits of the insulating organoplastic material and the interior surfaces of the plastics extruder to initiate release of these deposits therefrom.

The methods and compositions embodying the present invention are not limited to cleaning plastics extruders which have been used to extrude polyvinyl chloride compositions as insulation on conductors or in any other form, but may be used to clean plastics extruders used to extrude other organic thermoplastic compositions, which include cellulose plastic compounds, such as cellulose acetate, cellulose propionate, cellulose acetate-butyrate and ethyl cellulose; polyethylene; polypropylene; polystyrene; vinyl polymers, such as polyvinyl acetate, polyvinyl alcohol, polyvinyl butyrate, polyvinyl chloride, polyvinyl chloride-acetate and polyvinylidene chloride, and other organoplastic materials, which are physically incompatible with the silicone oil.

For example, the composition of Example V has also been used to clean successfully a plastics extruder which had been used for extruding polyethylene as insulation on the conductors. The cleaning composition of Example V was used to clean the last-mentioned plastics extruder of the residues and deposits of polyethylene while the temperature of the plastics extruder remained in a range of from about 350° F. to about 400° F. As in the case of cleaning plastics extruders used for extruding insulating polyvinyl chloride compositions, the surfaces of the walls of the bore and the stock screw of such cleaned plastics extruder were clean and shiny.

Similarly, the present invention is not limited to cleaning compositions comprising pelletized polyvinyl chloride. Other granulated organic thermoplastic materials, which include cellulose plastic compounds, such as cellulose acetate, cellulose propionate, cellulose acetate-butyrate and ethyl cellulose; polyethylene; polypropylene; polystyrene; vinyl polymers, such as polyvinyl acetate, polyvinyl alcohol, polyvinyl butyrate, polyvinyl chloride, polyvinyl chloride-acetate and polyvinylidene chloride, and other plastic materials, which are physically incompatible with the silicone oil, may be used as well to form cleaning compositions within the scope of this invention.

These granulated thermoplastic materials may be used singly or in any suitable mixtures thereof in any desirable combinations, when necessary, in accordance with apparatus and conditions to be used and organic thermoplastic materials to be removed. For example, pellets of polystyrene may be used to prepare a cleaning composition for removal of polyvinyl chloride residues from a plastics extruder, the temperature of which for any reason remains during the cleaning operation near the higher limits of the temperature range between 300° F. and 400° F. Similarly, mixtures of organic thermoplastic materials having low-softening and high-softening points, as compared to the softening point of the organoplastic material being removed from a plastics extruder, may be used as an ingredient of the cleaning compositions.

The specific examples of the methods of using the cleaning compositions of Examples I to VI, inclusive, refer to the use of these cleaning compositions for cleaning the apparatus of the type of the plastics extruder 11 at temperatures slightly below, or even above, the stock extrusion temperature of the polyvinyl chloride ingredient of these cleaning compositions. However, the preferred operating temperature range for the last-mentioned cleaning compositions is between about 200° F. and 400° F., the temperature in each particular case being so selected that a substantial portion of the granulated organic thermoplastic material of such cleaning compositions is allowed to pass through the plastics extruders only slightly affected thermally. In such instances, the granulated organoplastic material will present a great number of scouring edges and corners while being relatively stiff, as compared to thermally deformed granules, and, therefore, will produce best cleaning action on the interior surfaces of the plastics extruders. The cleaning compositions may also be possibly employed successfully at temperatures other than those within the preferred operating range, depending on the operating properties of the apparatus to be cleaned and the thermal properties of the granulated organic thermoplastic material ingredient of such cleaning compositions. Similarly, although it is recommended to remove the head 26, including the extruding tools, in some instances it may be necessary to remove the extruding tools only, leaving the head 26 attached to the extruding apparatus.

The cleaning compositions and methods might be used unmodified or with modifications within the spirit and scope of the invention for removing undesirable residues and deposits of organoplastic materials from metal surfaces of devices other than plastics extruders. For example, some injection molding devices, calendering devices, sheet-forming devices and other equipment used for forming articles from organoplastic compositions which are substantially physically incompatible with silicone oil might be cleaned by the cleaning compositions embodying the invention.

In cases of plastics extruders of the screw type, it is recommended to confine the amounts of silicone oil in the cleaning composition, preferably, to the range of from about 0.2 percent to about 2 percent of silicone oil by weight of the granulated thermoplastic material of the cleaning composition. It has been observed that the use of the cleaning compositions of the type of Examples III and VI, but containing silicone oil in excess of 2 percent, for cleaning the screw-type plastics extruders, resulted in such slippage of the granulated organoplastic material relative to the plastics-working surfaces of the plastics extruders that the efficiency of the cleaning composition was somewhat reduced. However, the percentage ranges of the silicone oil ingredient of the cleaning compositions to be used with different types of the granulated organoplastic material, working conditions and type of plastics-working devices are not given as limitative, but only as illustrative. In some instances it may be possible to go beyond the preferred proportions of the silicone oil in the cleaning composition by using different types of granulated form or the formula of the granulated organic thermoplastic material, or by cleaning a different type of apparatus. Also, silicone oils of higher viscosities than indicated may be used in some instances in the form of greases, if necessary.

It is to be understood that the above-described arrangements are simply illustrative of the application of the principles of the invention. Other arrangements may be devised by those skilled in the art, which will embody the principles of the invention and fall within the spirit and scope thereof.

What is claimed is:

1. A composition for cleaning interior plastics-working surfaces of plastics extruders, which comprises a granulated organoplastic material, and silicone oil in the form of a film coating the granules of the organoplastic material, said organoplastic material being physically incompatible with said silicone oil and having thermoplastic properties.

2. A composition for cleaning the interior plastics-working surfaces of plastics extruders, which comprises a granulated organoplastic material, and silicone oil in the form of a film coating the granules of the organoplastic material, said organoplastic material being selected from the group consisting of polyvinyl chloride and polyethylene.

3. A composition for cleaning the interior plastics-working surfaces of plastics extruders, which comprises a granulated organoplastic material, and silicone oil in the form of a film coating the granules of the organoplastic material, said organoplastic material being physically incompatible with said silicone oil and having thermoplastic properties, said silicone oil being selected from the group consisting of dimethyl silicone fluids and methylphenyl silicone fluids.

4. A composition for cleaning the interior plastics-working surfaces of plastics extruders, which comprises a granulated organoplastic material, and silicone oil in the form of a film coating the granules of the organoplastic material, said organoplastic material being selected from the group consisting of polyvinyl chloride and polyethylene and said silicone oil being selected from the group consisting of dimethyl silicone fluids and methylphenyl silicone fluids.

5. A cleaning composition as claimed in claim 4, in which said silicone oil is a dimethyl silicone fluid.

6. A cleaning composition as claimed in claim 4, in which said silicone oil is a methylphenyl silicone fluid.

7. A cleaning composition as claimed in claim 4, in which said granulated organoplastic material is polyvinyl chloride.

8. A cleaning composition as claimed in claim 4, in which said granulated organoplastic material is polyethylene.

9. A composition for cleaning the interior plastics-working surfaces of plastics extruders, which comprises granulated organoplastic material, and silicone oil in the form of a film coating the granules of the organoplastic material in amounts from about 0.2 percent to about 2 percent by weight of said organoplastic material, said organoplastic material being physical incompatible with said silicone oil and having thermoplastic properties, said silicone oil having a viscosity of the order of from about 20 centistokes to about 100,000 centistokes at 25° C.

10. A composition for cleaning the interior plastics-working surfaces of plastics extruders, which comprises granulated organoplastic material, and silicone oil in the form of a film of a silicone oil-in-water emulsion coating the granules of the organoplastic material in amounts from about 0.2 to about 2 percent of silicone oil by weight of said organoplastic material, said organoplastic material being physically incompatible with said silicone oil and having thermoplastic properties.

11. A composition for cleaning the interior plastics-working surfaces of plastics extrudes, which comprises granulated polyvinyl chloride in the form of substantially cube-shaped granules of the order of about ⅛ inch in size, and silicone oil in the form of a film coating the granu'es of polyvinyl chloride in amounts from about 0.2 percent to about 2 percent of silicone oil by weight of the polyvinyl chloride granules.

12. A composition for cleaning the interior plastics-working surfaces of plastics extruders, which comprises granulated polyvinyl chloride in the form of substantially cube-shaped granules of the order of about ⅛ inch in size, and silicone oil in the form of a film coating the granules of polyvinyl chloride in amounts of about 0.5 percent of silicone oil by weight of the polyvinyl chloride granules, said silicone oil having a viscosity of the order of 40 centistokes at 25° C.

13. A composition for cleaning the interior plastics-working surfaces of plastics extruders, which comprises granulated polyvinyl chloride in the form of substantially cube-shaped granules of the order of about ⅛ inch in size, and silicone oil in the form of a film of a silicone oil-in-water emulsion coating the granules of the polyvinyl chloride, in amounts from about 0.2 percent to about 2 percent of silicone oil by weight of the polyvinyl chloride granules, said silicone oil emulsion containing from about 35 percent to about 50 percent of solicone oil by weight of said emulsion.

14. A composition for cleaning the interior plastics-working surfaces of plastics extruders, which comprises a granulated organoplastic material, and silicone oil in the form of a film coating the granules of the plastic material, said organoplastic material being selected from the group consisting of cellulose acetate, cellulose propionate, cellulose acetate-butyrate, ethyl cellulose, polyethylene, polypropylene, polystyrene, polyvinyl acetate, polyvinyl alcohol, polyvinyl butyrate, polyvinyl chloride, polyvinyl chloride-acetate, and polyvinylidene chloride.

15. The method of cleaning the interior plastics-working surfaces of plastics extruders, which comprises applying a film of silicone oil to a granulated organic thermoplastic material physically incompatible with said silicone oil, and simultaneously rotating the stock screw of a plastics extruder to be cleaned and feeding the silicone oil-coated granulated material into the interior of the plastics extruder until the interior plastics-working surfaces thereof are cleaned of undesirable residues and deposits of organoplastic materials extruded previously therethrough.

16. The method of cleaning the interior plastics-working surfaces of plastics extruders, which comprises applying a film of silicone oil to a granulated organic thermoplastic material physically incompatible with said silicone oil, simultaneously rotating the stock screw of a plastics extruder to be cleaned and feeding the silicone oil-coated granulated material into the interior of said plastics extruder, the rotating stock screw forcing the silicone oil-coated granulated material through said plastics extruder, and continuing the feeding and rotating step until said interior plastics-working surfaces are cleaned of undesirable residues and deposits of organoplastic materials previously extruded therethrough.

17. The method of cleaning the interior plastics-working surfaces of plastics extruders, which comprises applying a film of silicone oil to a granulated material physically incompatible with said silicone oil, said granulated material being selected from the group consisting of polyvinyl chloride and polyethylene, simultaneously rotating the stock screw of a plastics extruder to be cleaned and feeding the silicone oil-coated granulated material into the interior of said plastics extruder, the rotating stock screw forcing the silicone oil-coated granulated material through said plastics extruder, and continuing the feeding and rotating step until said interior plastics-working surfaces are cleaned of undesirable residues and deposits of organoplastic materials previously extruded therethrough.

18. The method of cleaning the interior plastics-working surfaces of plastics extruders, which comprises applying a film of silicone oil to a granulated organic thermoplastic material physically incompatible with said silicone oil, simultaneously rotating the stock screw of said plastics extruder and feeding the silicone oil-coated granulated material into the interior of said plastics extruder, the rotating stock screw forcing the silicone oil-coated granulated material through said plastics extruder, maintaining the temperature of said plastics extruder such that a substantial portion of said silicone oil-coated granules tend to retain their initial plastic memory properties, and continuing the feeding and rotating step until said interior plastics-working surfaces are cleaned of undesirable residues and deposits of organoplastic materials previously extruded therethrough.

19. The method of cleaning the interior plastics-working surfaces of a screw-type plastics extruder, which comprises mixing silicone oil and a granulated organic thermoplastic material physically incompatible with said silicone oil, so that the granules of said granulated material are coated with a film of said silicone oil in amounts from about 0.2 percent to about 2 percent of silicone oil by weight of said granulated material, simultaneously rotating the stock screw of said plastics extruder and feeding the silicone oil-coated granulated material into the interior of said plastics extruder, the rotating stock screw forcing the silicone oil-coated granulated material through said plastics extruder, maintaining the temperature of said plastics extruder such that a substantial portion of said silicone oil-coated granules tend to retain their initial plastic memory properties, and continuing the feeding and rotating step until said interior plastics-working surfaces are cleaned of undesirable residues and deposits of organoplastic materials previously extruded therethrough.

20. The method of cleaning the interior plastics-working surfaces of a screw-type plastics extruder, which comprises mixing silicone oil in the form of a silicone oil-in-water emulsion and a granulated organic thermoplastic material physically incompatible with said silicone oil, so that the granules of said granulated material are coated with a film of said silicone oil emulsion in amounts from about 0.2 percent to about 2 percent of silicone oil by weight of said granulated material, simultaneously rotating the stock screw of said plastics extruder and feeding the silicone oil emulsion-coated granulated material into the interior of said plastics extruder, the rotating stock screw forcing the silicone oil emulsion-coated granulated material through said plastics extruder, maintaining the temperature of said plastics extruder such that a substantial portion of said silicone oil emulsion-coated granules tend to retain their initial plastic memory properties, and continuing the feeding and rotating step until said interior plastics-working surfaces are cleaned of undesirable residues and deposits of organoplastic materials previously extruded therethrough.

21. The method of cleaning the interior plastics-working surfaces of a screw-type plastics extruder having a rotatable stock screw and a removable head, which comprises mixing silicone oil and a granulated organic thermoplastic material physically incompatible with said silicone oil, so that the granules of said granulated material are coated with a film of said silicone oil in amounts from about 0.2 percent to about 2 percent of silicone oil by weight of said granulated material, removing a head from a plastics extruder to be cleaned immediately after said plastics extruder is shut down, simultaneously rotating the stock screw of said plastics extruder and feeding the silicone oil-coated granulated material into the interior of said plastics extruder, the rotating stock screw forcing the silicone oil-coated granulated material through said plastics extruder, maintaining the temperature of said plastics extruder between about 200° F. and about 400° F. so that a substantial portion of said silicone oil-coated granules tend to retain their initial plastic memory properties, and continuing the feeding and rotating step until said interior plastics-working surfaces are cleaned of undesirable residues and deposits of organoplastic materials previously extruded therethrough.

22. The method of cleaning the interior plastics-working surfaces of a screw-type plastics extruder, which comprises mixing polyvinyl chloride in the form of cube-shaped granules of about ⅛ inch in size and silicone oil having a viscosity of the order of from about 20 centistokes to about 100,000 centistokes at 25° C., so that the granules are coated with a film of said silicone oil in amounts from about 0.2 percent to about 2 percent of silicone oil by weight of said granules, simultaneously rotating the stock screw of said plastics extruder and feeding the silicone oil-coated granules into the interior of said plastics extruder, the rotating stock screw forcing the silicone oil-coated granules through said plastics extruder, maintaining the temperature of said plastics extruder such that a substantial portion of said silicone oil-coated granules tend to retain their initial plastic memory properties, and continuing the feeding and rotating step until said interior plastics-working surfaces are cleaned of undesirable residues and deposits of organoplastic materials previously extruded therethrough.

23. The method of cleaning the interior plastics-working surfaces of a screw-type plastics extruder, which comprises mixing polyvinyl chloride in the form of cube-shaped granules of about ⅛ inch in size and silicone oil having a viscosity of the order of about 40 centistokes at 25° C., so that the granules are coated with a film of said silicone oil amounting to about 0.5 percent of silicone oil by weight of said granules, simultaneously rotating the stock screw of said plastics extruder and feeding the silicone oil-coated granules into the interior of said plastics extruder, the rotating stock screw forcing the silicone oil-coated granules through said plastics extruder, maintaining the temperature of said plastics extruder between about 300° F. and 400° F. so that a substantial portion of said silicone oil-coated granules tend to retain their initial plastic memory properties, and continuing the feeding and rotating step until said interior plastics-working surfaces are cleaned of undesirable residues and deposits of organoplastic materials previously extruded therethrough.

24. The method of cleaning the interior plastics-working surfaces of a screw-type plastics extruder, which comprises mixing polyvinyl chloride in the form of cube-shaped granules of about ⅛ inch in size and silicone oil-in-water emulsion so that the granules are coated with a film of said emulsion in amounts from about 0.2 percent to about 2 percent of silicone oil by weight of said granules, simultaneously rotating the stock screw of said plastics extruder and feeding said emulsion-coated granules into the interior of said plastics extruder, the rotating stock screw forcing said emulsion-coated granules through said plastics extruder, maintaining the temperature of said plastics extruder such that a substantial portion of said emulsion-coated granules tend to retain their initial plastic memory properties, and continuing the feeding and rotating step until said interior plastics-working surfaces are cleaned of undesirable residues and deposits of organoplastic materials previously extruded therethrough.

25. The method of cleaning the interior plastics-working surfaces of a screw-type plastics extruder, which comprises mixing polyvinyl chloride in the form of cube-shaped granules of about ⅛ inch in size and silicone oil-in-water emulsion containing from about 35 percent to 50 percent of silicone oil by weight of said emulsion, so that the granules are coated with a film of said emulsion in amounts from about 0.2 percent to about 2 percent of silicone oil by weight of said granules, simultaneously rotating the stock screw of said plastics extruder and feeding the emulsion-coated granules into the interior of said plastics extruder, the rotating stock screw forcing the emulsion-coated granules through said plastics extruder, maintaining the temperature of said plastics extruder between about 300° F. and about 400° F. so that a substantial portion of said emulsion-coated granules tend to retain their initial plastic memory properties, and continuing the feeding and rotating step until said interior plastics-working surfaces are cleaned of undesirable residues and deposits of organoplastic material previously extruded therethrough.

References Cited in the file of this patent

UNITED STATES PATENTS

| | | |
|---|---|---|
| 999,491 | Ellis | Aug. 1, 1911 |
| 2,346,228 | Merrill | Apr. 11, 1944 |
| 2,698,265 | Klingel | Dec. 28, 1954 |
| 2,744,841 | Cassis | May 8, 1956 |
| 2,779,696 | Rutherford | Jan. 29, 1957 |